J. B. COTTRELL.
CULINARY PLIERS.
APPLICATION FILED APR. 18, 1916.
1,224,606.
Patented May 1, 1917.
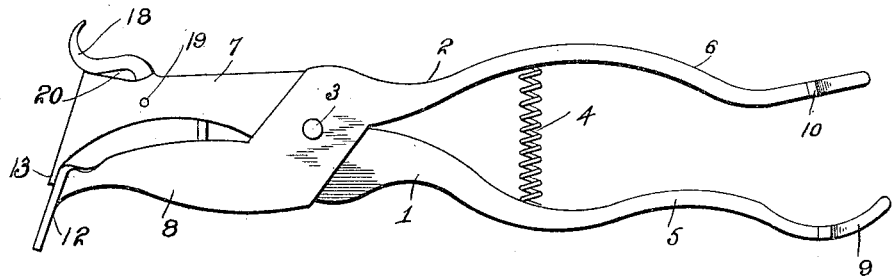
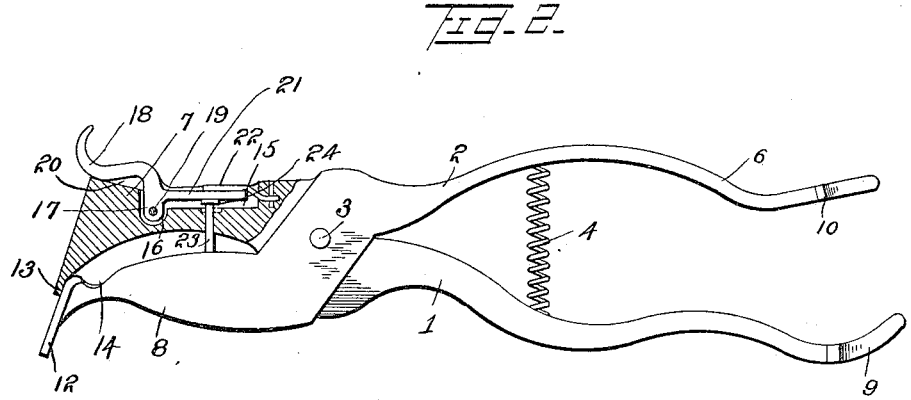
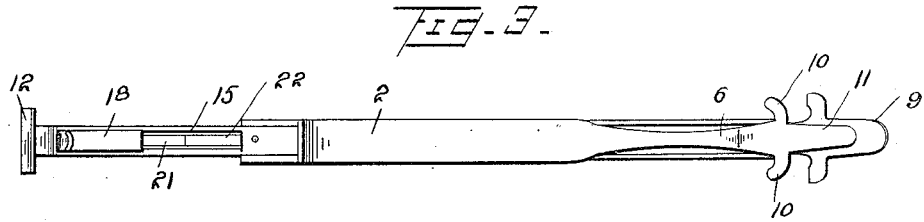
Witnesses
R. Stanton.
Rob O Meyer.
Inventor
J. B. Cottrell.
By
Attorney

UNITED STATES PATENT OFFICE.

JOSEPH BROOKS COTTRELL, OF EDNA, ALABAMA.

CULINARY PLIERS.

1,224,606.                     Specification of Letters Patent.           Patented May 1, 1917.

Application filed April 18, 1916.   Serial No. 91,981.

*To all whom it may concern:*

Be it known that I, JOSEPH B. COTTRELL, a citizen of the United States, residing at Edna, in the county of Choctaw and State of Alabama, have invented certain new and useful Improvements in Culinary Pliers; and I do hereby declare the following to be a full, clear, and exact description of the invention, such as will enable others skilled in the art to which it appertains to make and use the same.

This invention relates to pliers and more particularly to pliers which are designed for use in a kitchen, having jaws which are constructed for gripping pans, for removing them from a stove when hot so as to eliminate the liability of burning one's fingers and also the necessity of using a cloth to prevent burning.

Another object of this invention is to provide a stove lid lifter formed upon one end of one of the handles of the pliers and a device for insertion through openings in the handles of skillets, stew pans or the like.

A further object of this invention is to provide an auxiliary jaw for gripping the sides of utensils which extend at an angle of 135° or greater from the bottom of the pan and to provide means coacting with an auxiliary jaw which will automatically open the jaw upon the opening of the main jaws of the pliers and also means for automatically closing the auxiliary jaw upon the closing of the main jaws.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved culinary pliers.

Fig. 2 is a side elevation of the pliers showing parts thereof in section, and

Fig. 3 is a top plan view of the pliers.

Referring more particularly to the drawings 1 and 2 designate the sections of the pliers which are pivotally connected as is shown at 3. The sections 1 and 2 have their jaw ends positioned upon opposite sides of the pivotal point 3 of their handle ends so that the spring 4 which is positioned between the handles 5 and 6 will hold the jaws 7 and 8 open.

The handle 5 has its outer end curved and shaped to form a stove lid lifter 9. The end of the handle 6 is straight and has a pair of laterally extending arcuate ears 10 formed thereon which in coaction with the portion 11 of the handle form a holder for insertion through the opening in the end of a skillet, stew pan or the like for lifting the stew pan from the stove when desired.

The jaw 8 has an extension 12 formed upon its outer end which angles downwardly from the outer end of the jaw and is provided for coaction with the downwardly projecting lip 13 which is formed upon the outer end of the jaw 7. The lip 13 and the extension 12 are provided for gripping the sides of different types of baking pans, so as to permit removal of the pans from an oven or stove without the use of a cloth and without liability of burning one's fingers. The jaw 8 is provided with an inwardly extending recess 14 formed in its upper face directly in the rear of the extension 12, which recess is adapted for receiving the bead of a pan.

The upper surface of the jaw 7 is provided with a longitudinally extending cutout portion 15 which has an extension 16 formed upon its outer end. The lower end 17 of an auxiliary jaw 18 is seated in the extension 16 and is pivotally connected to the jaw 7 by a pin 19. The portion of the jaw 18 which extends out of the recess 15 is shaped for coaction with the upper end 20 of the outer end of the jaw 7 for forming jaws for gripping the sides of pans, wherein the sides extend at an angle of 135° or more from the bottom of the pan.

A tongue 21 is formed upon the auxiliary jaw 18 and extends longitudinally of the recess 15. A flat spring 22 has one end seated in a recess formed in the jaw 7 and held therein in any suitable manner and the other end engaging the upper surface of the tongue 21. The spring 22 is provided for forcing the tongue 21 downwardly in the recess 15 for moving the jaw 18 into an open position when the jaws 7 and 8 are opened. A pin 23 is slidably carried by the jaw 7 and projects therethrough having one end engaging the upper inner surface of the jaw 8. The head 24 of the pin 23 engages the under surface of the tongue 21 so that when the jaws 7 and 8 are closed the pin 23 will be forced upwardly through the jaw 7 and force the tongue 21 downwardly against the tension of the spring 22, for moving the jaw 18 into a closed position with respect to the face 20 of the jaw 7. The pin 23 has a head 24 formed thereon for preventing the pin from falling out of the opening in the jaw 7 in which it is slidably seated.

In reducing the invention to practice certain minor features of construction, combination and arrangement of parts may necessitate alterations to which the patentee is entitled provided such alterations are comprehended within the scope of what is claimed.

What is claimed is:—

1. In a pair of pliers, a pair of pivoted members having handles and jaws formed thereon, an auxiliary jaw pivotally connected to the upper of said first named jaws, a tongue formed upon said auxiliary jaw member, a spring carried by said upper jaw and engaging said tongue for moving said auxiliary jaw into an open position, a pin slidably carried by said upper jaw and having a head end, said head end engaging said tongue for moving said auxiliary jaw into a closed position against the tension of said spring when said first named jaws are moved into a closed position, said pin being engaged by the lower of said first named jaws for forcing it into engagement with and to move said tongue upon the closing of said jaws.

2. In a pair of pliers, a pair of pivoted members having handles and jaws formed thereon, an auxiliary jaw pivotally connected to the upper of said first named jaws, a tongue formed upon said auxiliary jaw, a spring carried by said upper jaw and engaging said tongue for moving said auxiliary jaw into an open position, a pin slidably carried by said upper jaw and having a head end, said head end engaging said tongue for moving said auxiliary jaw into a closed position against the tension of said spring when said first named jaws are moved into a closed position, said pin being engaged by the lower of said first named jaws for forcing it into engagement with and to move said tongue upon the closing of said jaws, said pin falling by its own weight out of engagement with said tongue upon opening movement of said jaws, and said upper jaw provided with a recess for receiving the head end of said pin.

3. In a pair of pliers, a pair of pivoted members having handles and jaws formed thereupon, the upper of said first named jaws provided with a recess formed in its upper surface, and an auxiliary jaw having its lower end pivotally mounted within said recess, a tongue formed upon said auxiliary member and extending longitudinally within said recess, a spring carried by said upper jaw and engaging said tongue for moving said auxiliary jaw into an open position, said spring moving said tongue downwardly within said recess and the lower inner end of said recess limiting the downward movement of said tongue for limiting the opening or spreading movement of said auxiliary jaw, a pin slidably carried by said upper jaw and having a head end, said head end engaging said tongue for moving said auxiliary jaw into a closed position against the tension of said spring when said first named jaws are moved into a closed position, said pin being engaged by the lower of said first named jaws for forcing it into engagement with and to move said tongue upon the closing of said jaws.

In testimony whereof I affix my signature in presence of two witnesses.

JOSEPH BROOKS COTTRELL.

Witnesses:
C. STORRS PENNINGTON,
CHARLIE COLEMAN.

Copies of this patent may be obtained for five cents each, by addressing the "Commissioner of Patents, Washington, D. C."